US008787931B2

(12) United States Patent
Chun

(10) Patent No.: US 8,787,931 B2
(45) Date of Patent: Jul. 22, 2014

(54) TERMINAL WITH VIRTUAL SPACE INTERFACE AND METHOD OF CONTROLLING VIRTUAL SPACE INTERFACE

(76) Inventor: Hea Kyung Chun, Seoul (KR)

( * ) Notice: Subject to any disclaimer, the term of this patent is extended or adjusted under 35 U.S.C. 154(b) by 0 days.

(21) Appl. No.: 13/497,922

(22) PCT Filed: Sep. 20, 2010

(86) PCT No.: PCT/KR2010/006503
§ 371 (c)(1),
(2), (4) Date: Aug. 30, 2012

(87) PCT Pub. No.: WO2011/037408
PCT Pub. Date: Mar. 31, 2011

(65) Prior Publication Data
US 2012/0322464 A1    Dec. 20, 2012

(30) Foreign Application Priority Data

Sep. 24, 2009  (KR) .................. 10-2009-0090611
Oct. 6, 2009   (KR) .................. 10-2009-0094777
Sep. 20, 2010  (KR) .................. 10-2010-0092540

(51) Int. Cl.
| H04W 24/00 | (2009.01) |
| H04B 1/38  | (2006.01) |
| H04M 11/04 | (2006.01) |
| G06F 3/048 | (2013.01) |
| G06F 3/14  | (2006.01) |

(52) U.S. Cl.
USPC ............. 455/456.1; 455/404.2; 455/456.3; 455/457; 455/566; 715/764; 715/767; 715/810; 715/835; 715/864

(58) Field of Classification Search
CPC ....... H04W 4/02; H04W 64/02; H04W 24/00; H04W 4/025; H04L 67/18; G06F 3/048; G06F 3/0482; G06F 3/0488; G06F 3/04817; G06F 3/04842
USPC ............. 455/456.3, 566, 404.2, 456.1, 457; 715/767, 810, 864, 835, 764
See application file for complete search history.

(56) References Cited

U.S. PATENT DOCUMENTS

2010/0007657 A1*  1/2010  Rurin ....................... 345/419
2014/0011517 A1*  1/2014  Lin et al. ................ 455/456.1

OTHER PUBLICATIONS

User Interface Controlling Method by Detecting User'S Gestures, Sep. 16, 2009 Application No. 10-2008-0068752.*
User Interface Controlling Method by Detecting User'S Gestures, Aug. 14, 2009 Application No. 10-2008-0068312.*
User Interface Controlling Method by Detecting User'S Gestures Sep. 16, 2009 Application No. 10-2008-0068752.*

* cited by examiner

Primary Examiner — Inder Mehra
(74) Attorney, Agent, or Firm — Maxine L. Barasch; Keohane & D'Alessandro PLLC

(57) ABSTRACT

Embodiments of the present invention provide a computer-implemented method for providing a mobile user interface on a mobile computing device. Specifically, among other things, embodiments of the present invention provide a computer-implemented infrastructure comprising: determining a virtual space; generating a display of at least a first portion of the virtual space; sensing a movement in real space of the mobile computing device; determining a change in position in real space of the mobile computing device based upon the sensed movement; determining whether the change in position is within a predefined boundary; and determining a viewing perspective of a second portion of the virtual space based upon the determined change in position of the mobile computing device.

20 Claims, 3 Drawing Sheets

TERMINAL WITH VIRTUAL SPACE INTERFACE AND METHOD OF CONTROLLING VIRTUAL SPACE INTERFACE

TECHNICAL FIELD

In general, the present invention relates to computer user interface systems and more particularly to a user interface for mobile computing devices.

BACKGROUND

As the demand for information and connectivity has grown, mobile computing devices have been increasingly deployed to provide convenient access to information. The term mobile computing devices, or mobile devices, as used herein, includes smart phones, cell phones, hand held computers and/or devices, personal digital assistants, mp3 players, portable media players, head mounted displays, and any other type of mobile user electronic device with a display area of some form.

The small size and light weight of mobile computing devices gives the user a sense of intimacy and control. However, these same advantages require that the screen size of mobile devices be small so that they can be hand held. This leads to cumbersome user input interfaces, since conventional interfaces, such as keyboards and mouse devices, usually hinder mobility.

Typically, users are limited to using touch screens or buttons as input interfaces to mobile devices. Such input interfaces are cumbersome requiring the use of both hands, one to hold the mobile device and the other to enter data.

Another difficulty with the small display screens of mobile devices is controlling the view and/or movement of representations of data and/or objects, also referred to as the virtual space. Indicating the desired movement in the virtual space may be cumbersome and slow using a stylus or touch screen. For example, indicating the desired motion in a three-dimensional virtual space may be awkward using two-dimensional interfaces such as stylus or touch screens. Moreover, controlling movement in a virtual space by using a stylus or touch screen may conflict with other modes of operation of the input interface. Heretofore, several unsuccessful attempts have been made to address these shortcomings.

U.S. Patent Application 2011/0096072 A1 discloses a three-dimensional (3D) space interface apparatus in which a user may directly touch and transform a 3D virtual object of a 3D space.

U.S. Patent Application 2009/0077463 A1 discloses a system configured to provide one or more virtual spaces that are accessible to users in which a markup language is implemented to communicate information between various components.

U.S. Patent Application 2010/0174421 A1 discloses a mobile user interface suitable for mobile computing devices which uses device position/orientation in real space to select a portion of content that is displayed.

None of these references, however, teach a method for providing a mobile user interface on a mobile computing device which includes sensing a movement in real space of the mobile computing, determining a change in position in real space of the mobile computing device based upon the sensed movement, determining a viewing perspective of a content treated as fixed in virtual space based upon the determined change in position of the mobile computing device, and generating a display of at least a portion of the content based upon the determined viewing perspective.

SUMMARY

In general, embodiments of the present invention provide a computer-implemented method for providing a mobile user interface on a mobile computing device. Specifically, among other things, embodiments of the present invention provide a computer-implemented infrastructure comprising: determining a virtual space; generating a display of at least a first portion of the virtual space; sensing a movement in real space of the mobile computing device; determining a change in position in real space of the mobile computing device based upon the sensed movement; determining whether the change in position is within a predefined boundary; and determining a viewing perspective of a second portion of the virtual space based upon the determined change in position of the mobile computing device.

A first aspect of the present invention provides a computer-implemented method for providing a mobile user interface on a mobile computing device, comprising: determining a virtual space; generating a display of at least a first portion of the virtual space; sensing a movement in real space of the mobile computing device; determining a change in position in real space of the mobile computing device based upon the sensed movement; determining whether the change in position is within a predefined boundary; and determining a viewing perspective of a second portion of the virtual space based upon the determined change in position of the mobile computing device.

A second aspect of the present invention provides a computer implemented method for providing a mobile computing device, comprising: a controller configured to determine a virtual space; a display configured to display at least a first portion of the virtual space; a touch panel comprising a plurality of sensors, wherein each sensor is configured to sense a movement in real space of the mobile computing device; the controller further configured to determine a change in position in real space of the mobile computing device based upon the sensed movement; the controller further configured to determine whether the change in position is within a predefined boundary; and the controller further configured to determine a viewing perspective of a second portion of the virtual space based upon the determined change in position of the mobile computing device.

A third aspect of the present invention provides a computer-implemented method for providing a computer program product for displaying a virtual space on a mobile user interface of a mobile computing device, the computer program product comprising a computer readable storage device, and program instructions stored on the computer readable storage device, to: determine a virtual space; generate a display of at least a first portion of the virtual space; sense a movement in real space of the mobile computing device; determine a change in position in real space of the mobile computing device based upon the sensed movement; determine whether the change in position is within a predefined boundary; and determine a viewing perspective of a second portion of the virtual space based upon the determined change in position of the mobile computing device.

BRIEF DESCRIPTION OF THE DRAWINGS

These and other features of this invention will be more readily understood from the following detailed description of the various aspects of the invention taken in conjunction with the accompanying drawings in which.

Figure 1:
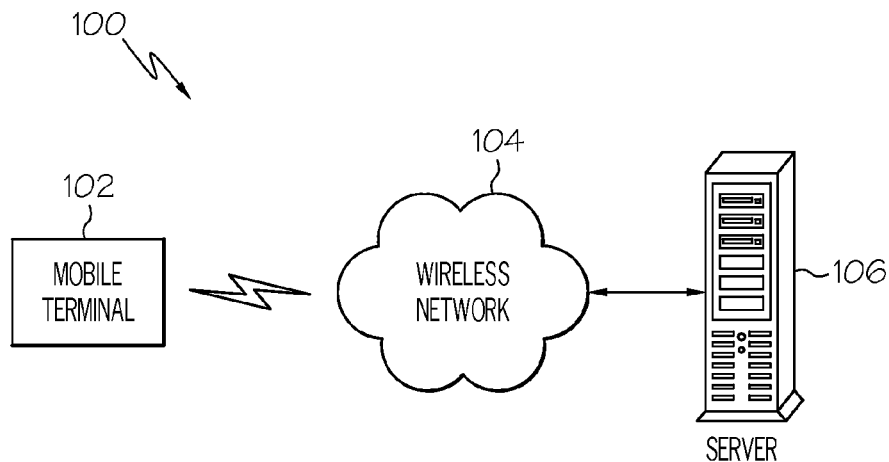
FIG. 1 depicts an exemplary environment in which various embodiments of the present invention can be practiced.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As used herein, the terms "mobile device," or "mobile computing device" or "mobile terminal" refer to any one or all of cellular telephones, personal data assistants (PDA's), palm-top computers, netbook computers, notebook computers, wireless electronic mail receivers and cellular telephone receivers, multimedia Internet-enabled cellular telephones, and similar handheld electronic devices which include a programmable processor or dedicated graphics processing chip, memory and a display.

As used herein, the term "user interface" refers to software processes operating on a computing device which present a series of images and menus to users and provide various interface tools to receive user inputs for interacting with the computing device or content on the computing device. The various aspects provide a user interface particularly suitable for mobile computing devices and portable computers (e.g., notebook computers). For ease of reference, the various aspects may be referred to herein or in the drawings as a "mobile user interface" to distinguish such user interfaces from traditional user interfaces originally developed for fixed computing devices which may be referred to as "graphical user interface". It is important to note that various implementations of a mobile user interface may include graphical features, tools, or icons. Therefore, the references to "mobile user interface" versus "graphical user interface" are not intended to require or imply that a mobile user interface according to the various aspects may not include graphical elements.

Personal hand-held computing and communication devices nowadays have much of the processing power of desktop computers. However, their display size and resolution remain fundamental restraints. Modern desktop computer monitors typically range in size between 17" at 1440.times.900 (WXGA+) resolution to 22" at 1680.times.1050 (WSXGA+) resolution. In contrast, notebook computer displays typically range from 10.2" at 1024.times.768 (XGA) to 17" at 1440.times.900 (WXGA+). Hand-held mobile computing devices have much smaller displays which are typically a couple inches in size.

To better fit content to the display size or display resolution, some mobile computing devices permit the display to present content in either portrait or landscape orientation. Some hand-held mobile computing devices detect the display orientation in response to users rotating the device and change the content orientation format to match the display orientation. Recently released mobile computing devices have built-in accelerometers which can sense a change in the device orientation enabling the processor or dedicated graphics processing chip to automatically adjust the content orientation. While this utility may better match the content to the dimensions of the display, it does not increase the size of the content window.

To minimize the display size limitation, the size of mobile computing devices can be increased to accommodate larger displays. However, this approach can only be taken so far before the computing device is no longer "hand-held" or mobile. Increasing the display resolution can help by enabling more content to be presented within the display. However, there are limits to the size and separation of pixels that the average human eye can resolve, even on high-definition displays.

Since there are practical limits to the size and resolution of mobile computing device displays, the traditional approach has been to allow file content to be much larger than the viewing window of the display and to provide vertical and horizontal scroll bars that can be manipulated to move the file content with respect to the display. More recently, mobile computing devices have been sold which allow file content to be much larger than the viewing window (i.e., display) and enable users to reposition the file within the viewing window by dragging a stylus or finger across a touch screen display. These approaches are almost direct transplants of desktop graphical user interface solutions to the hand-held computing environment. As a result, graphical user interfaces employed on mobile computing devices suffer the limitations of both desktop and hand-held worlds, resulting in a desktop-like user experience on a small screen.

The known graphical user interfaces implemented on mobile computing devices are familiar to most users from desktop computer use experience However, such solutions are not optimized for hand-held computing devices and thus cause a number of user experience issues. For one, such solutions require two hands (one to hold the device and another to manipulate the graphical user interface). For another, the small size of the display combined with the counter-intuitive presumption of moving a file within the small device makes it difficult to comprehend the entire document and can lead to users getting "lost" within large files.

The mobile user interface further presumes that the mobile computing device display functions in a manner similar to a magnifying glass or viewfinder of a camera that can be moved about to view different portions of the content (in contrast to the fixed "window" of conventional graphical user interfaces). The presumption allows users to view and interact with content (e.g., applications, files, images, and documents) in a natural manner that takes advantage of the hand-held portability of mobile computing devices. The mobile user interface enables users to read text documents or view images as if they were viewing the document on a desk or on a wall using a magnifying glass to scan over the document. Moving a hand-held device from left to right to read text is more natural than the counter-intuitive operation of convention graphical user interfaces in which documents must be dragged from right to left to read text. The various aspects provide a mobile user interface that frees hand-held device users from the limitations of display size and resolution, as well as enable one-handed operation that eliminates the need for pointing devices such as a mouse, touch pad, touchscreen, or arrow keys.

As indicated above, embodiments of the present invention provide a computer-implemented method for providing a mobile user interface on a mobile computing device. Specifically, among other things, embodiments of the present invention provide a computer-implemented infrastructure comprising: determining a virtual space; generating a display of at least a first portion of the virtual space; sensing a movement in real space of the mobile computing device; determining a change in position in real space of the mobile computing device based upon the sensed movement; determining whether the change in position is within a predefined boundary; and determining a viewing perspective of a second portion of the virtual space based upon the determined change in position of the mobile computing device.

FIG. 1 illustrates an exemplary environment in which various embodiments of the present invention can be practiced. The environment 100 includes a mobile terminal 102 in communication with a server 106 via wireless network 104. Mobile terminal 102 may refer to any one or all of cellular telephones, personal data assistants (PDA's), palm-top computers, netbook computers, notebook computers, wireless electronic mail receivers and cellular telephone receivers, multimedia Internet-enabled cellular telephones, and similar handheld electronic devices which include a programmable processor or dedicated graphics processing chip, memory, and a display. The environment 100 may include any number of mobile terminals 102.

Wireless network 104 refers to any type of computer network that is not connected by cables of any kind. It is a method by which homes, telecommunications networks, and enterprise (business) installations avoid the costly process of introducing cables into a building, or as a connection between various equipment locations. Wireless telecommunications networks are generally implemented and administered using a transmission system called radio waves. This implementation takes place at the physical level (layer) of the OSI model network structure.

Examples of the wireless network 104 in which the mobile terminal 102 can operate, include, but are not limited to, an Advanced Mobile Phone System (AMPS) network, a Narrowband Advanced Mobile Phone System (N-AMPS) network, a Cellular Digital Packet Data (CDPD) network, a Global System for Mobile communications (GSM) network, a Code Division Multiple Access (CDMA) network, a Wideband Code Division Multiple Access (W-CDMA) network, a Time Division Multiple Access (TDMA) network, a Universal Mobile Telephone Service (UMTS) network, an Integrated Digital Enhanced Network (iDEN), a Specialized Mobile Radio (SMR) network and an Enhanced Specialized Mobile Radio (ESMR) network.

Embodiments of the invention can include one or more servers 106. Each of the servers 106 may be configured with an operating system including any commercially-available server operating system. Each of the servers 106 may also be running one or more applications, which can be configured to provide services to one or more mobile terminals 102 and/or other servers 106. One or more servers 106 may include content defining the virtual space. The virtual space may include virtual content, such as buildings, stores, clubs, sporting arenas, parks, beaches, cities, and towns. The virtual space may include content accessible only by the user of mobile terminal 102 or content that is shared by a community of users.

Figure 2:
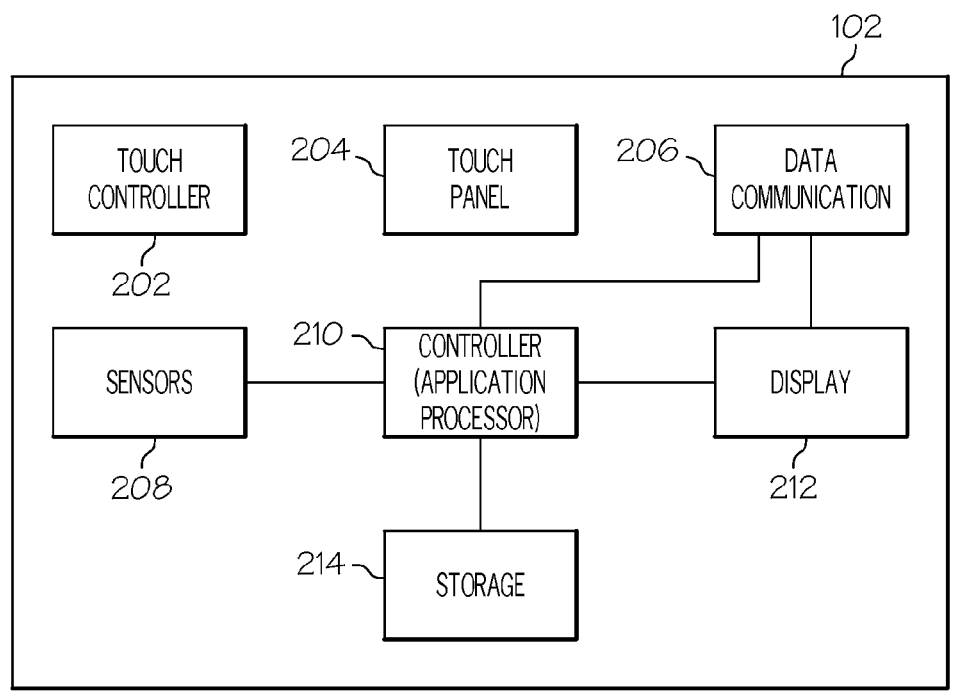
FIG. 2 depicts a mobile terminal according to an embodiment of the present invention.

FIG. 2 depicts a mobile terminal according to an embodiment of the present invention. Mobile terminal 102 may include touch controller 202, touch panel 204, data communication component 206, sensors 208, controller (i.e., application processor) 210, display 212, and storage 214. The display 212 may include a liquid crystal display (LCD) panel, light emitting diode (LED) panel, a touch screen panel, a three-dimensional (3D) panel, a flexible display panel, or the like.

The mobile terminal may include controller 210 configured to perform actions based on outputs from touch controller 202 that can include, but not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Controller 210 can also perform additional functions that may not be related to panel processing, and can be coupled to storage 214 and display 212 such as an LCD display for providing a user interface to a user of the mobile terminal 102.

In some embodiments, the virtual space enabled mobile terminal 102 may consist of one or more of the following: storage 214, input device, sensors 208, signal processor, controller 210, display 212, notifier, identifier, and data communication 206. Storage may store user contents and different states representing the current status of the mobile terminal. The input device may include on/off hardware such as mechanical and optical buttons and supporting software. The mobile terminal 102 may include any number of sensors 208 in a touch panel 204. The touch controller 202 may determine whether a touch event has been detected at each of the sensors 208 in the touch panel 204. Each sensor 208 may include an accelerometer, a gyroscope, a magnetic sensor, a pressure sensor (excluding the pressure), or the like. Each sensor 208 may sense each of three dimensions (X, Y, and Z) and detect the moving direction of the mobile terminal 102 in the virtual space. Any combination of these device functions are used in virtual space control.

The mobile terminal 102 may include a signal processor. The signal processor may amplify, reduce, filter one or more samples, and/or mix and optimize signals from the sensors 208. For example, the signal processor may stabilize a user's unintended movement. The controller 210 may decide the virtual space based on distance and direction. For example, if the virtual space is the discrete space, the controller 210 may determine the next space based on a next space in a grid.

The notifier may include any means to notify a user of the mobile terminal 102. The notifier may use any combination of arrows, colors, sounds, vibrations, or the like to show one or more statuses, direction and/or user action. The identifier may identify and allow usage of a virtual space. Data communication 206 may allow connection between the server 106 and the mobile terminal 102 via the wireless network 104.

The mobile terminal 102 displays a portion of the virtual space when the system is on. When a user moves the mobile terminal 102 in any direction (e.g., up, down, left, right), the sensors 208 capture the movements. The mobile terminal 102 calculates the distance and direction of the movement and determines whether the movement is within a boundary. The boundary may be defined by a viewable portion of the display 212. If within the boundary, the mobile terminal 102 maintains the current status. If not within the boundary, the mobile terminal 102 moves to (i.e., displays) the new portion of the virtual space based on the distance and the direction.

Figure 3:
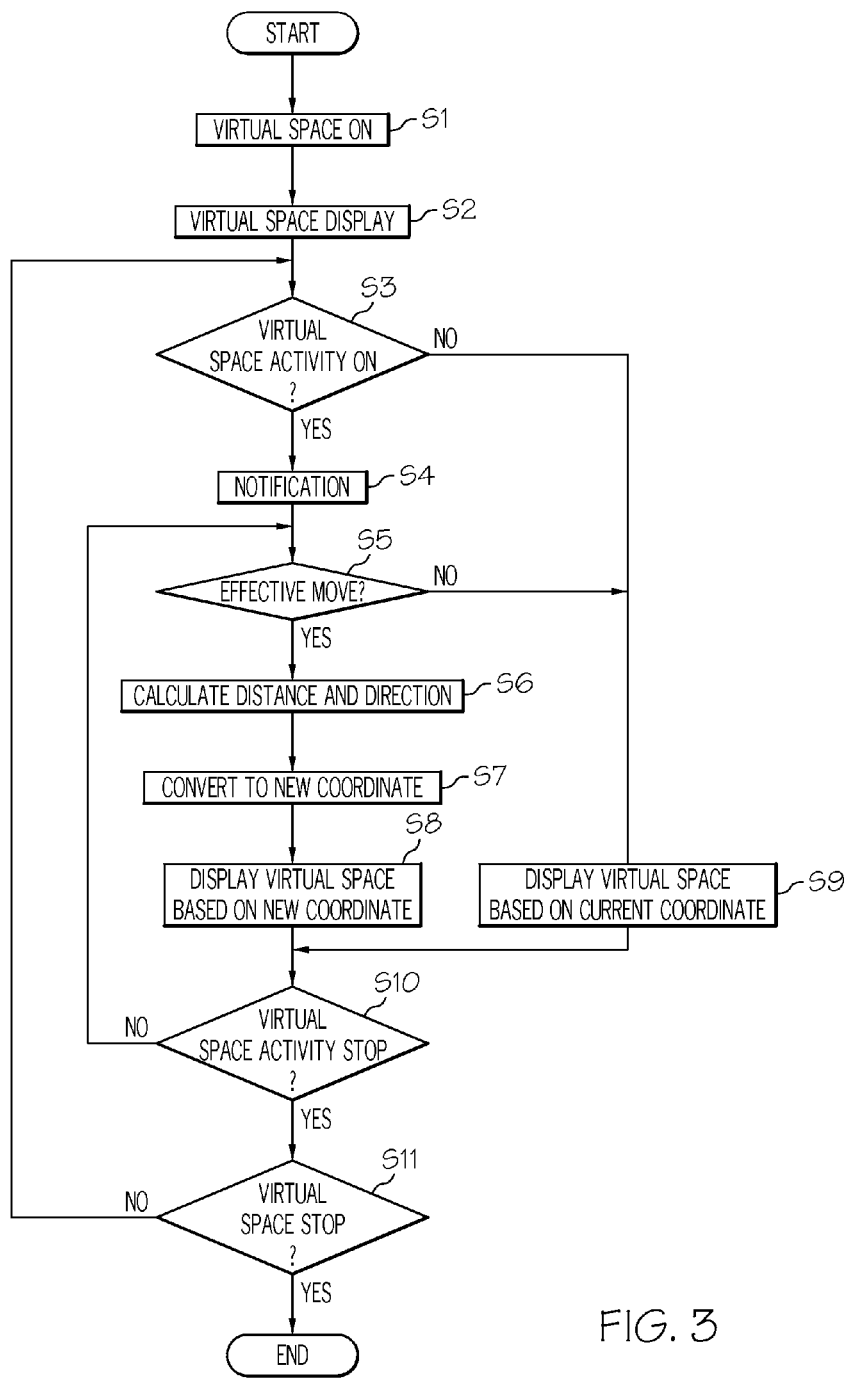
FIG. 3 depicts a method flow diagram of a mobile terminal for controlling a virtual space interface.

FIG. 3 depicts a more detailed method flow diagram of the mobile terminal for controlling a virtual space interface. At S1, the user starts the operation. At S2, a part of the virtual space is displayed. At S3, a determination is made whether virtual activity is on. If virtual space activity is on, notification is sent to the user at S4. If the virtual space is not used, the current status is maintained at S9. If an effective movement is detected at S5, a distance and direction of the movement is calculated at S6. It determines whether the distance and the direction are within a predefined boundary. The predefined boundary may be the entire viewable area or a predefined percentage of the viewable area of the display. The distance and direction of the movement is converted to new display coordinates at S7. At S8, the new portion of the virtual space is displayed based on the calculated coordinates. This process of determining the distance and direction of movements and displaying a part of virtual space based on the distance and direction is referred to as the 'virtual space activity'. Virtual space activity status is determined at S10. Virtual space status is determined at S11.

Figure 4:
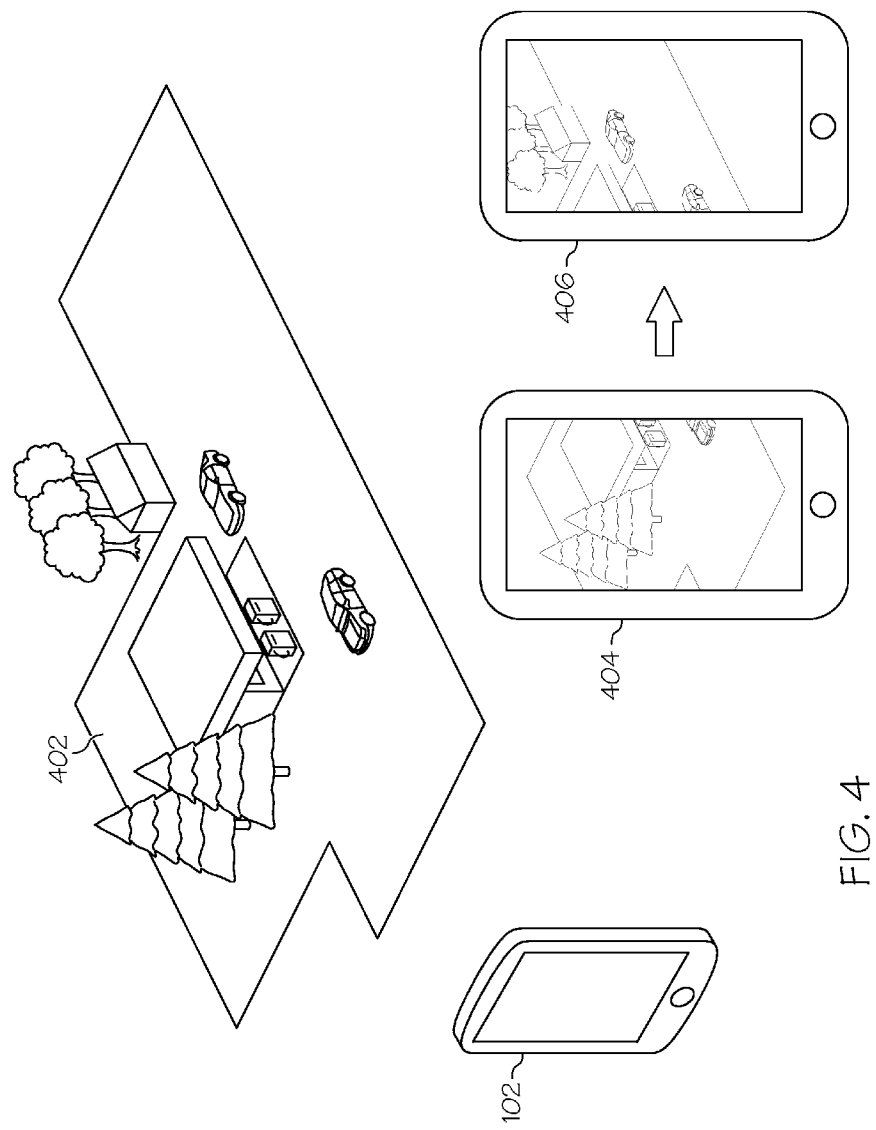
FIG. 4 depicts an illustrative example according to an embodiment of the present invention.

FIG. 4 depicts an illustrative example according to an embodiment of the present invention. Mobile terminal 102 and virtual space 402 are shown. Part of virtual space 404 is depicted on the display 212 of mobile device 102. An effective movement by the user of mobile terminal 102 displays the new part of virtual space 406 which is shown on the display 212.

The embodiments of the invention may be implemented as a computer readable signal medium or storage device, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for providing a mobile user interface on a mobile computing device, comprising:

providing a mobile computing device comprising at least one sensor configured to sense movement of the mobile computing device about an x-axis, a y-axis, and a z-axis in real space;

determining a three-dimensional virtual space comprising a virtual x-axis, a virtual y-axis, and a virtual z-axis;

generating a display of at least a first portion of the three-dimensional virtual space;

sensing a movement about the x-axis, the y-axis, and the z-axis in real space of the mobile computing device;

determining a change in position about the x-axis, the y-axis, and the z-axis in real space of the mobile computing device based upon the sensed movement;

determining whether the change in position is within a predefined boundary of real space; and determining a viewing perspective of a second portion of the three-dimensional virtual space based on coordinates along the virtual x-axis, the virtual y-axis, and the virtual z-axis corresponding to the determined change in position of the mobile computing device about the x-axis, the y-axis, and the z-axis in real space.

2. The computer-implemented method of claim 1, further comprising generating a display of the second portion of the virtual space when the determined viewing perspective is outside the predefined boundary.

3. The computer-implemented method of claim 1, wherein the step of determining a change in position in real space of the mobile computing device comprises determining at least one of a distance or direction based on the movement.

4. The computer-implemented method of claim 1, further comprising generating a notification of at least one of a direction or movement of the mobile computing device.

5. The computer-implemented method of claim 1, further comprising providing a data communication connection between the mobile computing device and a server.

6. The computer-implemented method of claim 5, wherein the mobile computing device communicates with the server via a wireless network.

7. A mobile computing device, comprising:
   a controller configured to determine a three-dimensional virtual space comprising a virtual x-axis, a virtual y-axis, and a virtual z-axis;
   a display configured to display at least a first portion of the three-dimensional virtual space;
   a touch panel comprising a plurality of sensors, wherein each sensor is configured to sense a movement of the mobile computing device about an x-axis, a y-axis, and a z-axis in real space;
   the controller further configured to determine a change in position in real space of the mobile computing device about an x-axis, a y-axis, and a z-axis based upon the sensed movement;
   the controller further configured to determine whether the change in position is within a predefined boundary of real space; and
   the controller further configured to determine a viewing perspective based on coordinates about the virtual x-axis, the virtual y-axis, and the virtual z-axis of a second portion of the three-dimensional virtual space corresponding to the determined change in position of the mobile computing device about the x-axis, the y-axis, and the z-axis.

8. The mobile computing device of claim 7, the display further configured to display the second portion of the virtual space when the determined viewing perspective is outside the predefined boundary.

9. The mobile computing device of claim 7, wherein the change in position in real space of the mobile computing device is determined by calculating at least one of a distance or direction based on the movement.

10. The mobile computing device of claim 7, further comprising a notifier configured to generate a notification of at least one of a direction or movement of the mobile computing device.

11. The mobile computing device of claim 7, further comprising a data communication component configured to provide a data communication connection between the mobile computing device and a server.

12. The mobile computing device of claim 11, wherein the mobile computing device communicates with the server via a wireless network.

13. The mobile computing device of claim 7, wherein at least one of the plurality of sensors comprises at least one of an accelerometer, gyroscope, magnetic sensor, or pressure sensor.

14. The mobile computing device of claim 7, further comprising a storage device configured to store a status associated with the mobile computing device.

15. A computer program product for displaying a virtual space on a mobile user interface of a mobile computing device, the computer program product comprising a computer readable storage device, and program instructions stored on the computer readable storage device, to:
   determine a three-dimensional virtual space comprising a virtual x-axis, a virtual y-axis, and a virtual z-axis;
   generate a display of at least a first portion of the three-dimensional virtual space;
   sense a movement of the mobile computing device about an x-axis, a y-axis, and a z-axis in real space;
   determine a change in position about the x-axis, the y-axis, and the z-axis in real space of the mobile computing device based upon the sensed movement;
   determine whether the change in position is within a predefined boundary of real space; and
   determine a viewing perspective of a second portion of the three-dimensional virtual space based on coordinates about the virtual x-axis, the virtual y-axis, and the virtual z-axis based upon the determined change in position of the mobile computing device about the x-axis, the y-axis, and the z-axis.

16. The computer program product of claim 15, the computer readable storage device further comprising instructions to generate a display of the second portion of the virtual space when the determined viewing perspective is outside the predefined boundary.

17. The computer program product of claim 15, wherein the change in position in real space of the mobile computing device is determined by calculating at least one of a distance or direction based on the movement.

18. The computer program product of claim 15, the computer readable storage device further comprising instructions to generate a notification of at least one of a direction or movement of the mobile computing device.

19. The computer program product of claim 15, the computer readable storage device further comprising instructions to provide a data communication connection between the mobile computing device and a server.

20. The computer program product of claim 19, wherein the mobile computing device communicates with the server via a wireless network.

* * * * *